US009333652B2

(12) United States Patent
Hu et al.

(10) Patent No.: US 9,333,652 B2
(45) Date of Patent: May 10, 2016

(54) SAFETY MONITORING SYSTEM FOR HUMAN-MACHINE SYMBIOSIS AND METHOD USING THE SAME

(71) Applicant: INDUSTRIAL TECHNOLOGY RESEARCH INSTITUTE, Hsinchu (TW)

(72) Inventors: Jhen-Jia Hu, Changhua County (TW); Hau-Wei Wang, Taipei (TW); Chung-Ning Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 60 days.

(21) Appl. No.: 14/224,476

(22) Filed: Mar. 25, 2014

(65) Prior Publication Data

US 2015/0131896 A1 May 14, 2015

(30) Foreign Application Priority Data

Nov. 11, 2013 (TW) .............................. 102140914 A

(51) Int. Cl.
G06K 9/00 (2006.01)
B25J 9/16 (2006.01)

(52) U.S. Cl.
CPC .............. *B25J 9/1676* (2013.01); *B25J 9/1697* (2013.01); *G06K 9/00335* (2013.01); *G06K 9/00355* (2013.01); *G06K 9/00771* (2013.01); *Y10S 901/09* (2013.01); *Y10S 901/47* (2013.01)

(58) Field of Classification Search
None
See application file for complete search history.

(56) References Cited

U.S. PATENT DOCUMENTS

| 1,457,730 A | 6/1923 | De Clamecy |
| 2,114,630 A | 4/1938 | Dow |
| 4,332,989 A * | 6/1982 | Nicolaisen ..................... 200/47 |

(Continued)

FOREIGN PATENT DOCUMENTS

| CN | 102479386 A | 5/2012 |
| CN | 102581445 A | 7/2012 |

(Continued)

OTHER PUBLICATIONS

Tan, Jeffrey Too Chuan, et al. "Human-robot collaboration in cellular manufacturing: design and development." Intelligent Robots and Systems, 2009. IROS 2009. IEEE/RSJ International Conference on. IEEE, 2009.*

(Continued)

*Primary Examiner* — Bhavesh Mehta
*Assistant Examiner* — Narek Zohrabyan
(74) *Attorney, Agent, or Firm* — Muncy, Geissler, Olds & Lowe PC

(57) ABSTRACT

A safety monitoring system for human-machine symbiosis is provided, including a spatial image capturing unit, an image recognition unit, a human-robot-interaction safety monitoring unit, and a process monitoring unit. The spatial image capturing unit, disposed in a working area, acquires at least two skeleton images. The image recognition unit generates at least two spatial gesture images corresponding to the at least two skeleton images, based on information of changes in position of the at least two skeleton images with respect to time. The human-robot-interaction safety monitoring unit generates a gesture distribution based on the at least two spatial gesture images and a safety distance. The process monitoring unit determines whether the gesture distribution meets a safety criterion.

14 Claims, 7 Drawing Sheets

(56) References Cited

U.S. PATENT DOCUMENTS

| | | | |
|---|---|---|---|
| 4,652,205 A * | 3/1987 | Ross et al. | 700/259 |
| 7,030,363 B2 * | 4/2006 | Watanabe et al. | 250/221 |
| 7,551,980 B2 * | 6/2009 | Sakagami et al. | 700/258 |
| 7,593,552 B2 * | 9/2009 | Higaki et al. | 382/118 |
| 7,751,938 B2 * | 7/2010 | Tsusaka et al. | 700/250 |
| 7,783,386 B2 * | 8/2010 | Merte et al. | 700/255 |
| 8,286,528 B2 * | 10/2012 | Fujioka et al. | 74/490.05 |
| 8,315,735 B2 * | 11/2012 | Nihei et al. | 700/245 |
| 2003/0076224 A1 * | 4/2003 | Braune | 340/500 |
| 2003/0083804 A1 | 5/2003 | Pilley et al. | |
| 2006/0049939 A1 * | 3/2006 | Haberer et al. | 340/541 |
| 2008/0161970 A1 * | 7/2008 | Adachi et al. | 700/253 |
| 2008/0243389 A1 * | 10/2008 | Inoue et al. | 701/301 |
| 2009/0326713 A1 * | 12/2009 | Moriya | 700/255 |
| 2010/0060511 A1 | 3/2010 | Nouvel et al. | |
| 2010/0100326 A1 | 4/2010 | Nouvel et al. | |
| 2010/0179690 A1 | 7/2010 | Matthias et al. | |
| 2011/0172825 A1 | 7/2011 | Lee et al. | |
| 2012/0022689 A1 * | 1/2012 | Kapoor | 700/255 |
| 2012/0062725 A1 * | 3/2012 | Wampler et al. | 348/86 |
| 2013/0090787 A1 | 4/2013 | Ryu et al. | |
| 2015/0158178 A1 * | 6/2015 | Burmeister et al. | 382/203 |

FOREIGN PATENT DOCUMENTS

| | | |
|---|---|---|
| CN | 102592045 A | 7/2012 |
| EP | 1 457 730 A2 | 9/2004 |
| TW | 553811 B | 9/2003 |
| TW | I220661 B | 9/2004 |
| TW | I303359 B | 11/2008 |

OTHER PUBLICATIONS

Duan, Feng, Jeffrey Too Chuan Tan, and Tamio Arai. "Using motion capture data to regenerate operator's motions in a simulator in real time." Robotics and Biomimetics, 2008. ROBIO 2008. IEEE International Conference on. IEEE, 2009.*

Krüger, J., et al., Image based 3D Surveillance for flexible Man-Robot-Cooperation, *CIRP Annals—Manufacturing Technology*, vol. 54, Issue 1, pp. 19-22, 2005.

Lew, Jae Y., et al., Interactive Control of Hunan/Robot Sharing Same Workspace, *Proceedings of the 2000 IEEE/RSJ, International Conference on Intelligent Robots and Systems*, pp. 535-540, 2000.

Kulić, Dana et al., Real-time safety for human—robot interaction, *Robotics and Autonomous Systems*, vol. 54, pp. 1-12, 2006.

Ogure, Takuya et al., Risk Management Simulator for Low-powered Human-collaborative Industrial Robots, *The 2009 IEEE/RSJ International Conference on Intelligent Robots and Systems*, pp. 49-54, Oct. 11-15, 2009.

Zaeh, Michael et al., Safety Aspects in a Human-Robot Interaction Scenario: A Human Worker Is Co-operating with an Industrial Robot, *FIRA 2009, Communications in Computer and Information Science*, vol. 44, pp. 53-62, 2009.

Tan, Jeffrey Too Chuan, et al., Safety Design and Development of Human-Robot Collaboration in Cellular Manufacturing, *5th Annual IEEE Conference on Automation Science and Engineering*, pp. 537-542, Aug. 22-25, 2009.

* cited by examiner

SAFETY MONITORING SYSTEM FOR HUMAN-MACHINE SYMBIOSIS AND METHOD USING THE SAME

This application claims the benefit of Taiwan application Serial No. 102140914, filed Nov. 11, 2013, the disclosure of which is incorporated by reference herein in its entirety.

TECHNICAL FIELD

The disclosure relates in general to a safety monitoring system, and more particularly to safety monitoring system for human-machine symbiosis and method using the same.

BACKGROUND

As the technology of robotics progresses, the safety between humans and robots becomes a concern for developers and researchers. In the course of interaction between a human and a robot, it becomes more difficult to detect and handle a region that may have a risk of safety. Conventional techniques in this regard make a separation of the human and the robot, based on a single fixed region. Unfortunately, the separation for every region may vary inevitably, and monitoring and managing in real-time and flexibility may become too difficult to achieve.

SUMMARY

According to an embodiment of the disclosure, a safety monitoring system for human-machine symbiosis is provided, including a spatial image capturing unit, an image recognition unit, a human-robot-interaction safety monitoring unit, and a process monitoring unit. The spatial image capturing unit, disposed in a working area, acquires at least two skeleton images. The image recognition unit generates at least two spatial gesture images corresponding to the at least two skeleton images, based on information of changes in position of the at least two skeleton images with respect to time. The human-robot-interaction safety monitoring unit generates a gesture distribution based on the at least two spatial gesture images and a safety distance. The process monitoring unit determines whether the gesture distribution meets a safety criterion.

According to an embodiment of the disclosure, a safety monitoring method for human-machine symbiosis is provided, including a spatial image capturing step, an image recognition step, a human-robot-interaction safety monitoring step, and a process monitoring step. The spatial image capturing step is for acquiring at least two skeleton images. The image recognition step is for generating, based on information of changes in position of the at least two skeleton images with respect to time, at least two corresponding spatial gesture images. The human-robot-interaction safety monitoring step is for generating a gesture distribution based on the at least two spatial gesture images and a safety distance. The process monitoring step is for determining whether the gesture distribution meets a safety criterion.

Figure 1:
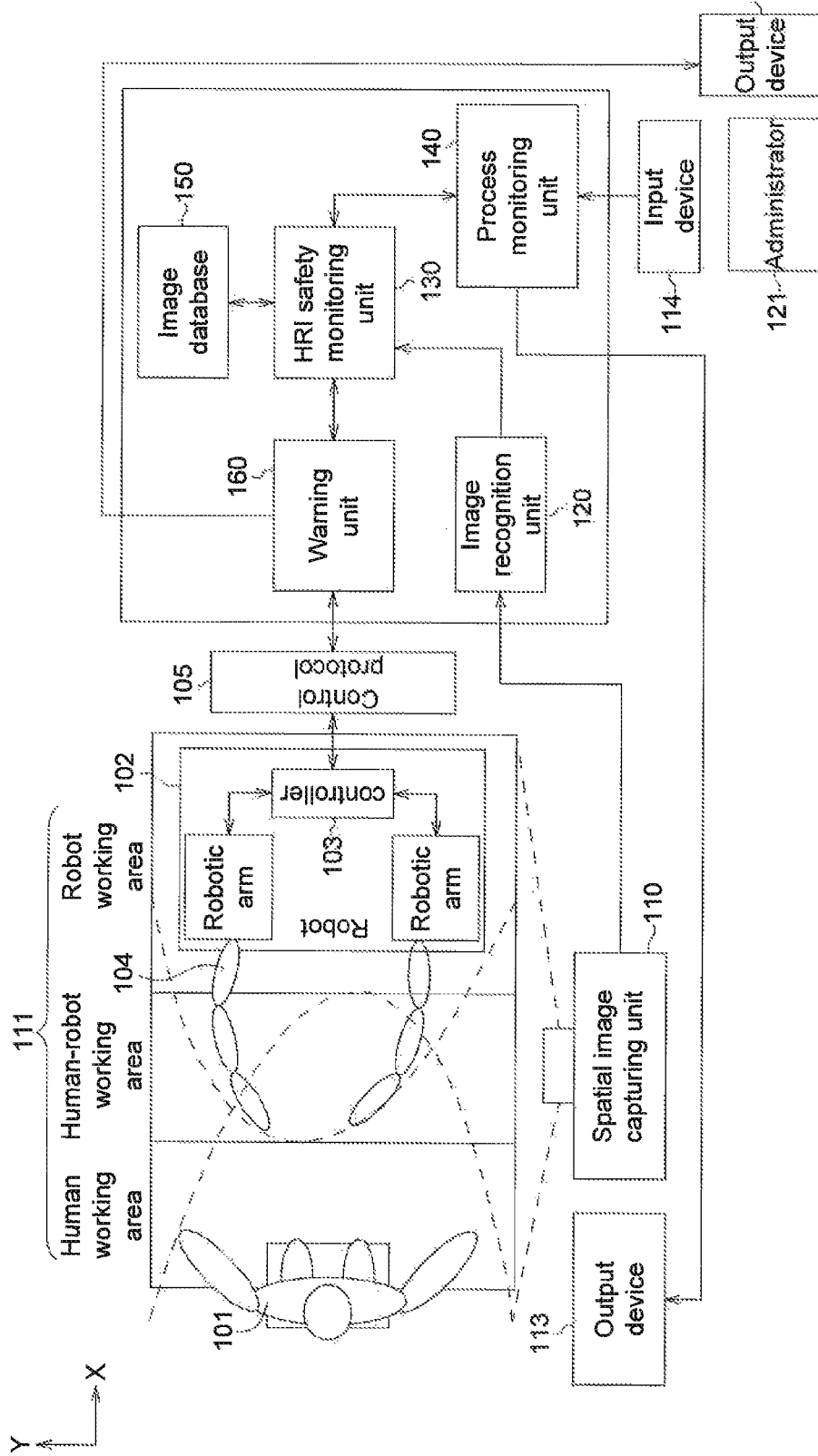
FIG. 1 is a block diagram showing a safety monitoring system for human-machine symbiosis according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A safety monitoring system for human-machine symbiosis according to the disclosure, for example, employs a spatial or depth image capturing unit to acquire a skeleton image of a human (e.g., an operator) and determine a gesture distribution of the human, in space, based on the skeleton image, accompanying with computation with respect to time, so as to obtain a movement path of the human in space. Likewise, the spatial image capturing unit acquires a skeleton image of a robot and then determines gesture positions and a position path with respect to time axis. The tendency of gesture movement in the next time point can be evaluated by using computation of the positions, velocities, accelerations of the human and the robot. In addition, it is determined, based on directions of movement paths, whether movement paths of hands and head of the human and movement paths of robotic arm(s) have any situation of intersection, cross-over, touching, overlapping, and so on, so as to achieve safety monitoring for both the human and the robot.

The following provides detailed description in terms of embodiments for the sake of description only, without limitation to the scope for protection of the invention.

Referring to FIG. 1, a block diagram shows a safety monitoring system 100 for human-machine symbiosis according to a first embodiment. The system 100 includes a spatial image capturing unit 110, an image recognition unit 120, a human-robot-interaction (HRI) safety monitoring unit 130, a process monitoring unit 140, an image database 150, and a warning unit 160. The spatial image capturing unit 110 mainly detects a human image and a robot image. The image recognition unit 120 obtains spatial gesture images of the human-robot interaction in a working area 111. The spatial gesture images are then sent to the human-robot-interaction safety monitoring unit 130. A determination is made based on a safety distance for gesture distribution and a safety criterion so as to obtain a detection result, wherein the safety distance is set by the human-robot-interaction safety monitoring unit 130, and the safety criterion is set by the process monitoring unit 140. When the detection result indicates that the gesture distribution does not meet the safety criterion, a warning signal is sent to a robot controller 103 to perform an instruction for a robotic arm 104, such as an instruction, such as an instruction for changing the movement path or an instruction for collision avoidance.

In this embodiment, an administrator 121 configures a spatial image capturing unit 110 in the working area 111, for example, in a position above the working area 111 or in a position of the robot 102, in order for the image recognition unit 120 to obtain skeleton images for recognition of the human 101 and the robot 102. A skeleton framework image, or called a skeleton image, of an object (such as a human or robot) is an image indicating a structural image including lines connecting movable joints of the object. In addition, the administrator 121 can set up a safety criterion for facilitating a process to be performed properly, and then the warning unit 160 performs risk assessment based on conditions such as, a working process, collision condition, trap condition, protection boundary, and so on, set by the administrator 121 in a management interface. If a risk of collision is probable, a warning signal is transmitted through a control protocol 105 to the robot controller 103.

Further, in this embodiment, output devices 112 and 113 provide information for the administrator 121 and the human 101 in the working area 111 to understand the working area, and information for working process monitoring and safety warning. The image database 150, linked to the human-robot-interaction safety monitoring unit 130, stores gesture distribution images of the human and the robot within a predetermined time period, in order for the human-robot-interaction safety monitoring unit 130 to determine whether there is a risk to the operation of the system.

Figure 2A:
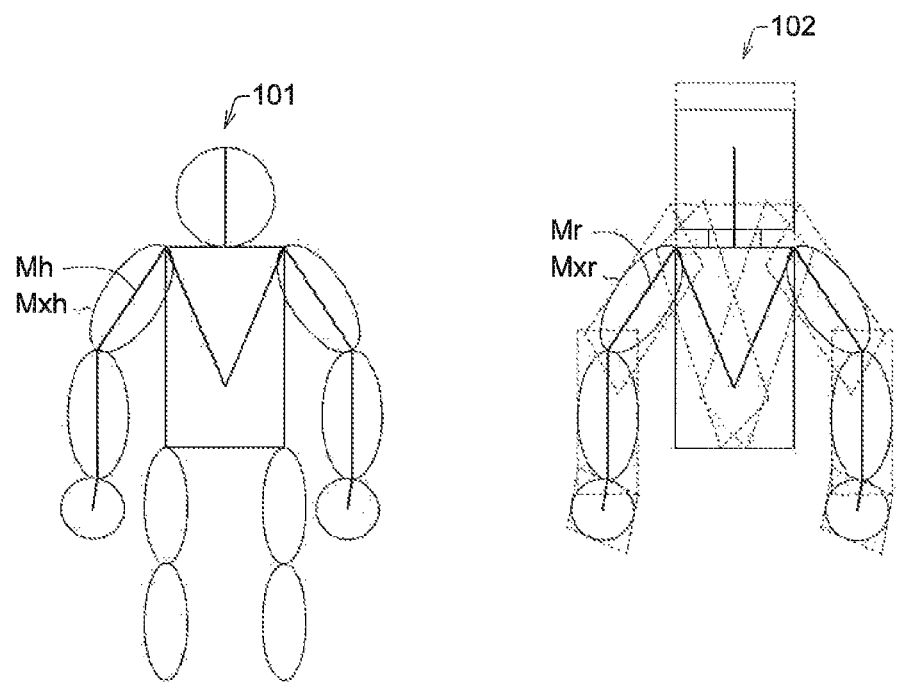
FIG. 2A illustrates skeleton images of a human (left) and a robot (right).

Referring to FIG. 2A, a human skeleton image Mh and a robot skeleton image Mr are illustrated. The human skeleton image Mh and the robot skeleton image Mr are indicated by segments connecting each detected points, for example, positions of joints, so as to obtain skeleton images of gestures of the heads and hands of the human 101 and the robot 102. In addition, the image recognition unit 120 generates expanded skeleton images Mxh and Mxr, based on the physical states of the human and the robot in the skeleton images. Thus, based on the expanded skeleton images, the image recognition unit 120 recognizes the gesture of the human's head, hands, and arms and the human and the gesture of the robot's portions similar to parts of a real body and limbs such as robotic arms and so on.

Figure 2B:
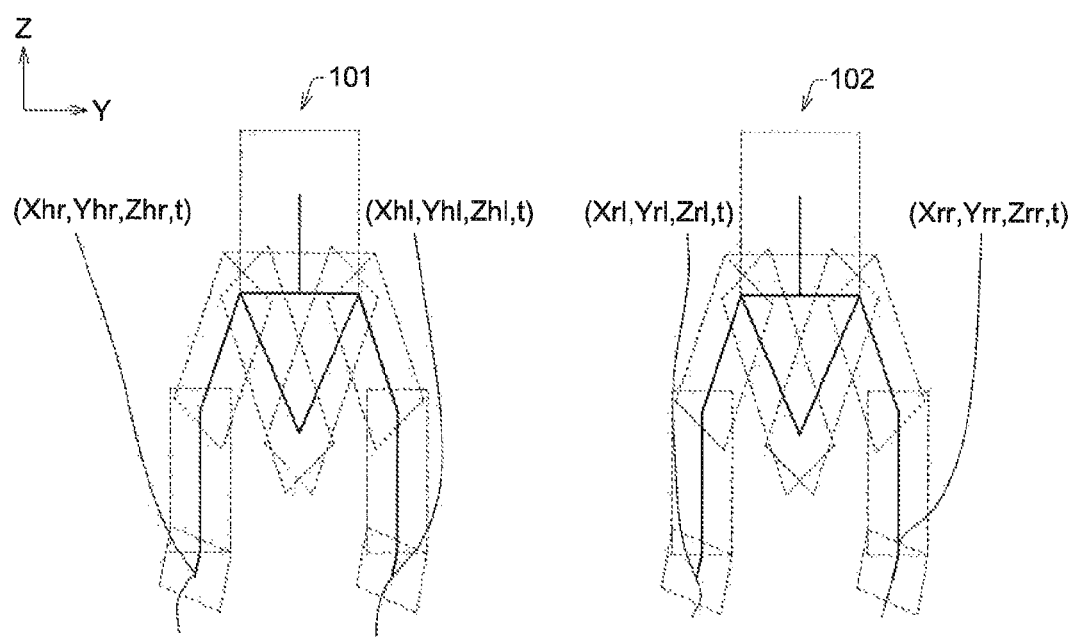
FIG. 2B illustrates spatial gesture images of the human (left) and the robot (right).

Referring to FIG. 2B, spatial gesture images of the human 101 and the robot 102 are shown. The image recognition unit 120 is used for recognizing movement paths of the above skeleton images, such as a position path, a velocity path, and an acceleration path, so as to generate the spatial gesture images of the human-robot interaction in the working area 111. For example, (Xhr, Yhr, Zhr, t) represents coordinate information and time with respect to the position of the right hand of the human 101. (Xhl, Yhl, Zhl, t) indicates coordinate information and time with respect to the position of the left hand of the human 101. Similarly, (Xrr, Yrr, Zrr, t) represents coordinate information and time with respect to the position of the right hand of the robot 102. (Xrl, Yrl, Zrl, t) represents coordinate information and time with respect to the position of the left hand of the robot 102. The positions of the human 101 and the robot 102 are usually in a relative relationship.

Figure 2C:
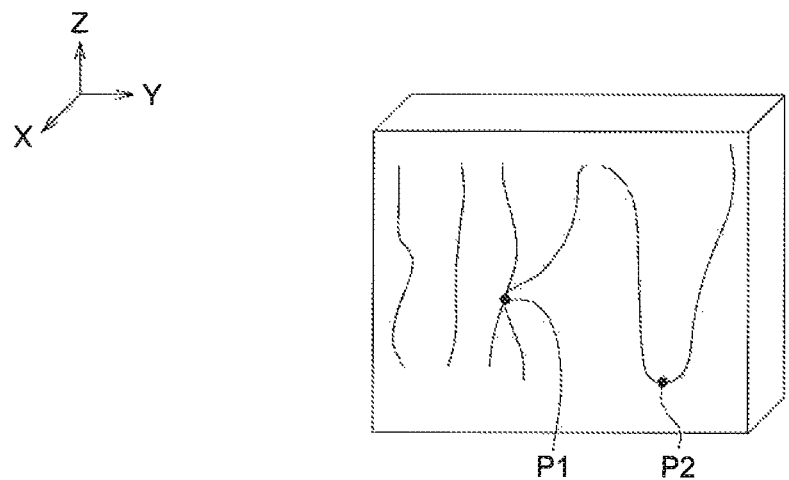
FIG. 2C illustrate whether a situation of cross-over occurs at a coordinate point of movement paths of the human and the robot, in a three-dimensional space.
Figure 2D:
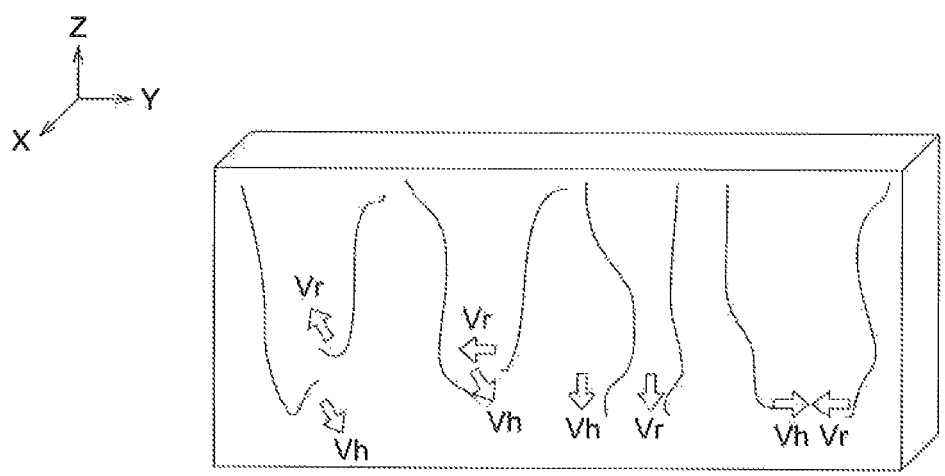
FIG. 2D illustrate vectors of movement paths of the human and the robot, at the next point of time in the three-dimensional space.

FIG. 2C illustrates whether a situation of cross-over occurs at a coordinate point P1 or P2 of the movement paths of the human and the robot, in a three-dimensional space. Referring to FIG. 2D, vectors Vh and Vr of the movement paths of the human and the robot, at the next point of time in the three-dimensional space, are illustrated.

Figure 3A:
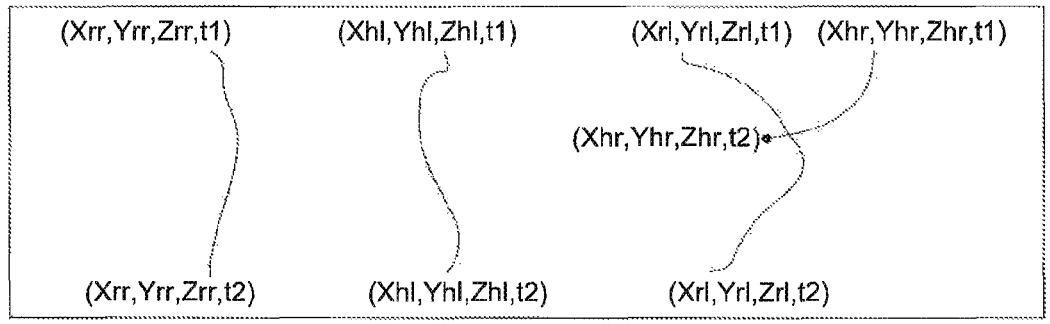
FIGS. 3A-3C show examples of times and information about movement paths, velocity paths, and acceleration paths, respectively, when the human and the robot interact.
Figure 3B:
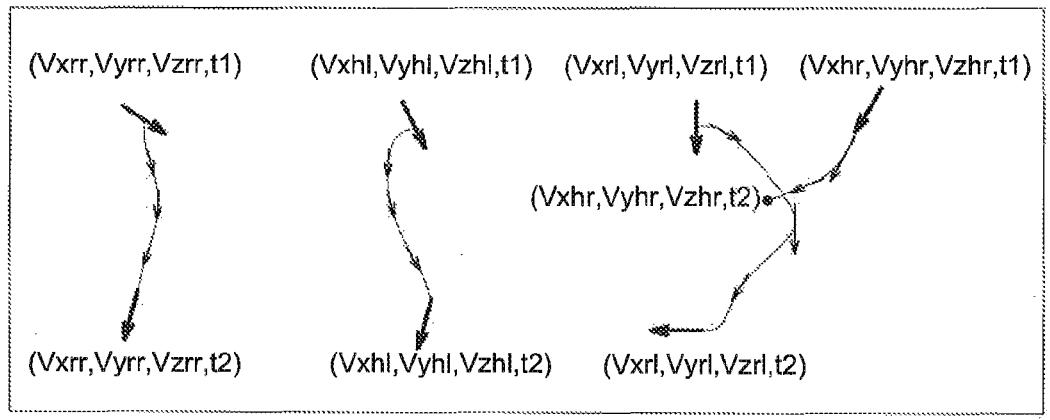
Figure 3C:
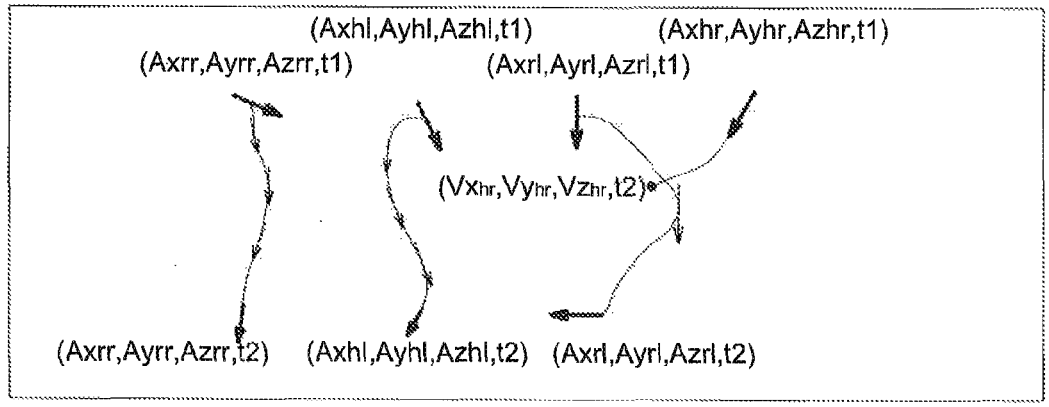

In addition, the image recognition unit 120 can further recognize changes in a gesture distribution between the human working area and the robot working area in order for the human-robot-interaction safety monitoring unit 130 to determine whether the operation state between the human and the robot is proper. As illustrated in FIGS. 3A-3C, when the human and the robot interact, information and time, such as movement paths, velocity paths, acceleration paths, and so on, for example, are employed by the human-robot-interaction safety monitoring unit 130 to determine whether the movement paths between the human and the robot overlap (any intersection points), and whether the movement paths overlap at the same time so as to ascertain whether to perform an instruction such as an instruction for changing the movement path of the robotic arm or an instruction for avoiding collision.

In FIG. 3A, (Xhr, Yhr, Zhr, t1) and (Xhr, Yhr, Zhr, t2) represent coordinate information and time of a position path of the right hand of the human 101. (Xhl, Yhl, Zhl, t1) and (Xhl, Yhl, Zhl, t2) represent coordinate information and time of a position path of the left hand of the human 101. (Xrr, Yrr, Zrr, t1) and (Xrr, Yrr, Zrr, t2) represent coordinate information and time of a position path of the right hand of the robot 102. (Xrl, Yrl, Zrl, t1) and (Xrl, Yrl, Zrl, t2) represent coordinate information and time of a position path of the left hand of the robot 102.

In FIG. 3B, (Vxhr, Vyhr, Vzhr, t1) and (Vxhr, Vyhr, Vzhr, t2) represent vector information and time of a velocity path of the right hand of the human 101. (Vxhl, Vyhl, Vzhl, t1) and (Vxhl, Vyhl, Vzhl, t2) represent vector information and time of a velocity path of the left hand of the human 101. (Vxrr, Vyrr, Vzrr, t1) and (Vxrr, Vyrr, Vzrr, t2) represent vector information and time of a velocity path of the right hand of the robot 102. (Vxrl, Vyrl, Vzrl, t1) and (Vxrl, Vyrl, Vzrl, t2) represent vector information and time of a velocity path of the left hand of the robot 102.

In FIG. 3C, (Axhr, Ayhr, Azhr, t1) and (Axhr, Ayhr, Azhr, t2) represent vector information and time of an acceleration path of the right hand of the human 101. (Axhl, Ayhl, Azhl, t1) and (Axhl, Ayhl, Azhl, t2) represent vector information and time of an acceleration path of the left hand of the human 101. (Axrr, Ayrr, Azrr, t1) and (Axrr, Ayrr, Azrr, t2) represent vector information and time of an acceleration path of the right hand of the robot 102. (Axrl, Ayrl, Azrl, t1) and (Axrl, Ayrl, Azrl, t2) represent vector information and time of an acceleration path of the left hand of the robot 102.

In another example, the human-robot-interaction safety monitoring unit 130 can further make a determination, based on gesture distribution images between the human and the robot and preset safety protection points of the human and the robot, wherein the preset safety protection points, for example, may indicate boundary of expanded skeleton images Mxh and Mxr. When it is determined that the distance between the preset safety protection points of the human and the robot, for example, boundary of expanded skeleton images Mxh and Mxr, is less than a safety distance assigned by the process monitoring unit 140, a warning signal is sent to the warning unit 160.

Figure 4A:
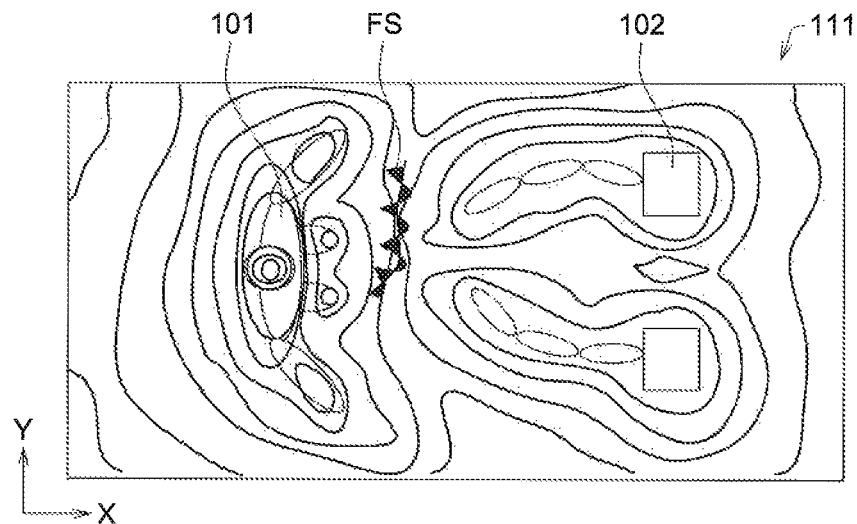
FIGS. 4A and 4B illustrate examples of contour maps for gesture distribution images between the human and the robot in a working area.
Figure 4B:
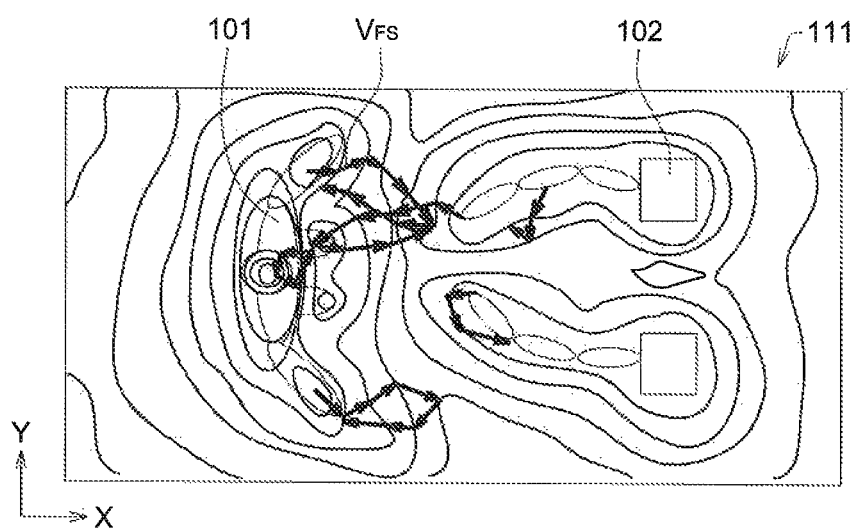

Referring to contour maps of FIGS. 4A and 4B, the human-robot-interaction safety monitoring unit 130 monitors the gesture distribution images between the human and the robot in the working area 111, based on the movement paths between the human and the robot, operations occurred at each time point in the spatial gesture images, and safety distance between the human and the robot under a proper process, so as to generate a gesture distribution.

In FIGS. 4A and 4B, at least two spatial gesture images during the interaction of the human and the robot in the working area 111 are indicated in a contour map, in order for the human-robot-interaction safety monitoring unit 130 to determine the gesture distribution between the human and the robot, according to changes of a normal vector $V_{FS}$ of a frontal surface FS in the contour map. A determination as to whether any frontal surface FS exists at a same height or different heights can be made according to the contour map, for example, as shown in FIG. 4A. If a frontal surface FS exists at the same height, the changes of the normal vector $V_{FS}$ of the frontal surface FS in FIG. 4B are used to determine whether any gradient vectors of contour lines are intersected, parallel, touched, overlapped and so on, thereby determining whether there is a possibility that the movement paths of the human 101 and the robot 102 intersect at a same position at a same time.

In addition, the process monitoring unit 140 is used for regulating the process and preset movement paths between the human and the robot, and setting a safety criterion. Under a proper working process, even if the movement paths of the human and the robot intersect at a same position at a same time, the safety criterion is still met. However, in a working process with an abnormal situation, the movement paths of the human 101 and the robot 102 are not preset movement paths and may intersect at a same position at a same time. In this case, if it is determined that the gesture distribution images between the human and the robot do not meet the safety criterion, the human-robot-interaction safety monitoring unit 130 sends a warning signal to the robot controller 103.

According to the embodiment illustrated in FIG. 1, the robot controller 103, in another example, may include a collision warning module (not shown) and a trap warning module (not shown). The collision warning module performs an instruction to avoid collision and the trap warning module performs an instruction to escape being trapped. When the robot controller 103 receives the warning signal, the collision warning module and the trap warning module determine, according to the warning signal, whether to perform an instruction such as the instruction to avoid collision or the instruction to escape being trapped, so as to change the gesture and the movement path of the robotic arm(s). In this way, the robotic arm(s) 104 can be directly moved to a region in which no part of the human 101 is present or the human 101 in a gesture is not present, so as to prevent the working performance from being reduced.

In this embodiment, the human-robot-interaction safety monitoring unit 130, in an example, is configured with a working-area dynamic monitoring unit (not shown) for monitoring the working areas of the human 101 and the robot 102. The working-area dynamic monitoring unit determines a protection boundary value with respect to human and robot, based on the expanded skeleton images Mxh and Mxr (as shown in FIG. 2A).

In contrast to many of conventional human-robot safety distribution detections using a working area distribution or separation, completed with an image of a single and fixed region, as a tool for judgment, the embodiment according to the invention is a working-area dynamic monitoring system for flexibly monitoring the working areas of the human and the robot by using the human-robot-interaction safety monitoring unit 130. Thus, the embodiment according to the invention can effectively result in a reduced safety distance for human-robot interaction at a close distance, and can lead to flexibility in space arrangement of the working area 111. The embodiment can be employed in monitoring of a fixed platform for human-robot interaction in an assembly production line, or monitoring of a mobile platform for human-robot interaction for medical care, home care, and so on.

According to the above safety monitoring system for human-machine symbiosis, a safety monitoring method for human-machine symbiosis is provided. The method includes a spatial image capturing step, an image recognition step, a human-robot-interaction safety monitoring step, a process monitoring step, a collision warning step, and a trap warning step. As an example of performing this method, the spatial image capturing step of this method can be performed by the spatial image capturing unit 110; the image recognition step can be performed by the image recognition unit 120; the human-robot-interaction safety monitoring step can be performed by the human-robot-interaction safety monitoring unit 130, and so on. In other examples, the method can be performed by a single device or unit, without being limited thereto. Each of the steps will be exemplified in detail in FIGS. 5A and 5B.

Figure 5A:
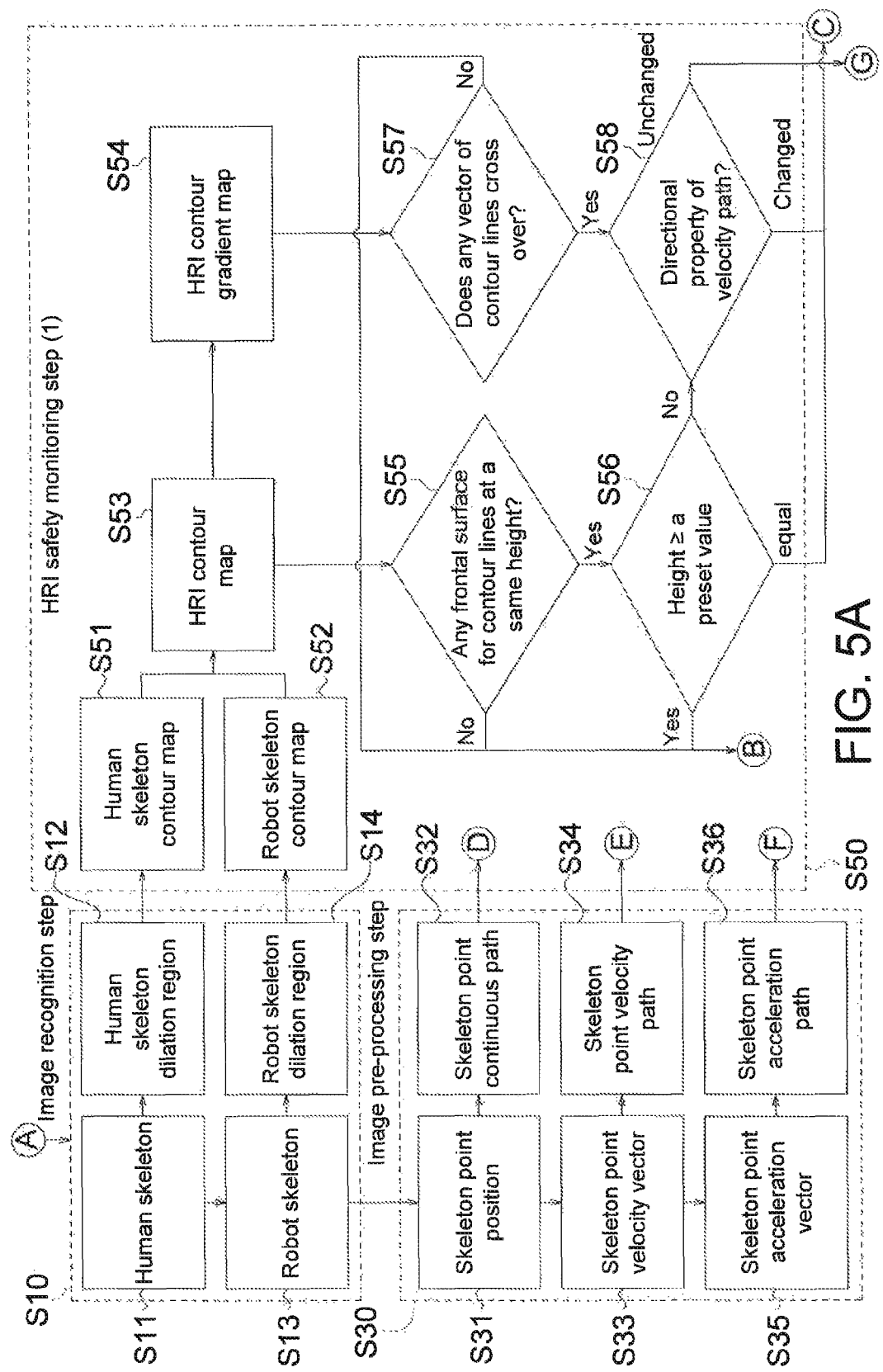
FIGS. 5A and 5B are flowcharts showing a safety monitoring method for human-machine symbiosis according to an embodiment.
Figure 5B:
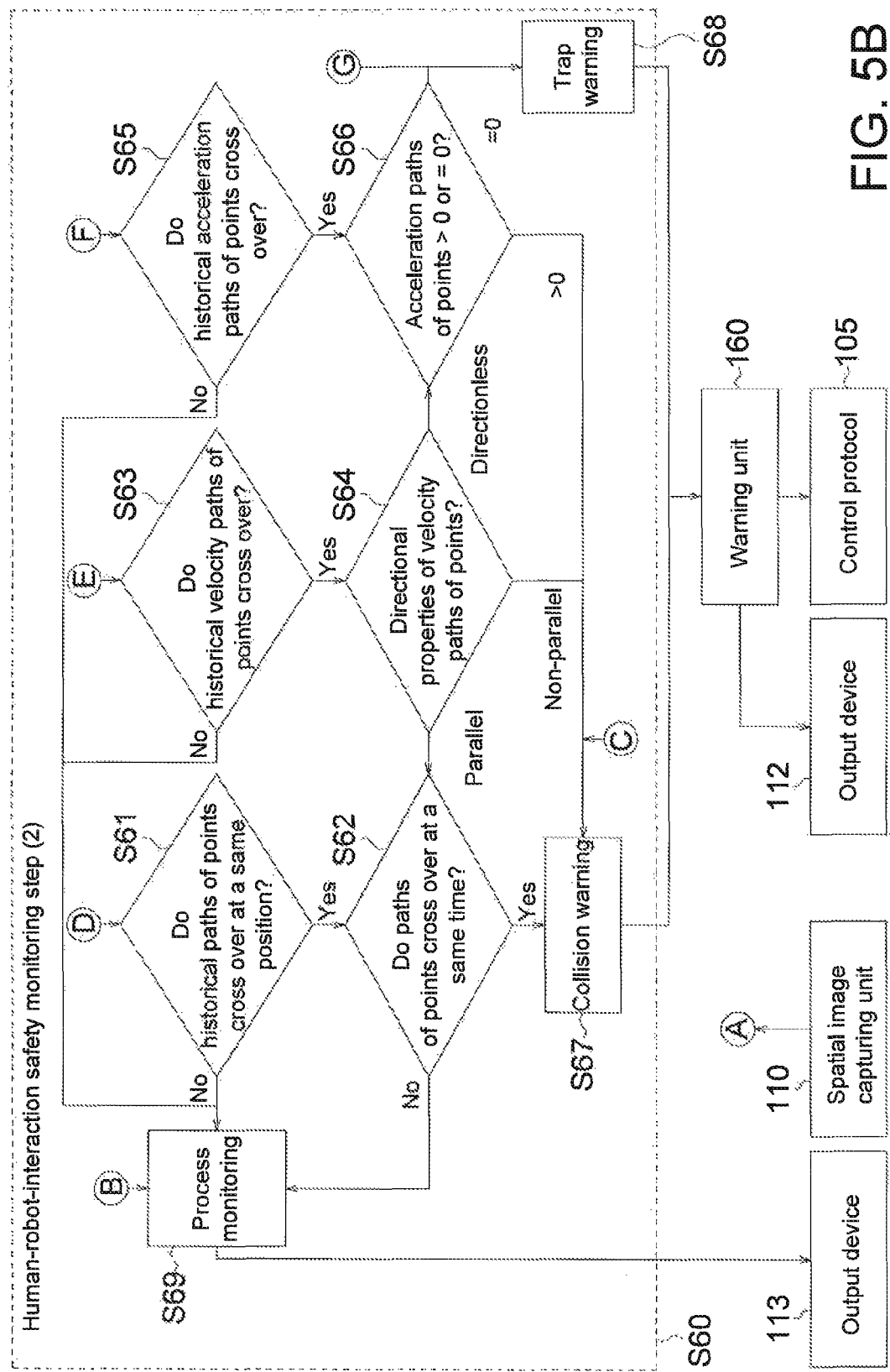

Referring to FIGS. 5A and 5B, a safety monitoring method for human-machine symbiosis according to an embodiment is shown. In FIG. 5A, the image recognition step S10 includes obtaining images for the recognition of a human skeleton S11, a human skeleton dilation region S12 (e.g., which is indicated by the expanded skeleton image Mxh), a robot skeleton S13, and a robot skeleton dilation region S14 (e.g., which is indicated by the expanded skeleton image Mxr), so as to at least two spatial gesture images correspondingly. In addition, the image recognition step S10 further includes performing an image pre-processing step S30 for acquiring the information including a position S31, a continuous path S32, a velocity vector S33, a velocity path S34, an acceleration vector S35, and an acceleration path S36, with respect to a point in a skeleton space, in order for the human-robot-interaction safety monitoring step S60 to generate a gesture distribution based on the at least two spatial gesture images and a safety distance.

In FIG. 5A, the human-robot-interaction safety monitoring step S50, for example, is performed by using a dilation gradient method. The human-robot-interaction safety monitoring step S50 includes acquiring a human skeleton contour map S51, a robot skeleton contour map S52, a human-robot-interaction contour map S53, a human-robot-interaction (HRI) contour gradient map S54. In the embodiment, whether there is any frontal surface for contour lines at a same height is determined based on the human-robot-interaction contour map, as in step S55, and the height of a frontal surface is compared with a preset value, as in step S56. It is further determined, based on the human-robot-interaction contour gradient map, whether any contour gradient vectors (normal vectors $V_{FS}$ of a frontal surface) cross over, as in step S57, and it is determined whether a directional property of velocity path of a point (in the contour map) varies or remains unchanged, as in step S58. In the above discussion, the frontal surface is an overlapping region of the at least two spatial gesture images. When the contour gradient vectors (e.g., normal vectors of the frontal surfaces) cross over, it indicates that the movement paths of the human and the robot may intersect at a same position at a same time.

In steps S55 and S56, when the contour map has a frontal surface existing at the same height, and the height of the frontal surface is equal to the preset value, it is determined that the gesture distribution does not meet the safety criterion, and a collision warning step S67 is then performed. Conversely, when the contour map has no frontal surface at a same height, or the height of the frontal surface is greater than the preset value, it is determined that the gesture distribution meets the safety criterion, and thus the collision warning step S67 will not be performed.

In steps S57 and S58, when the contour gradient vectors cross over, it is determined whether the directional properties of velocity paths of points of the at least two spatial gesture images change or remain unchanged, so as to perform a collision warning step S67 or a trap warning step S68. Conversely, if the contour gradient vectors do not cross over, it is determined that the gesture distribution meets the safety criterion, and thus neither the collision warning step S67 nor the trap warning step S68 will be performed.

In FIG. 5B, when the information mentioned in the image pre-processing step S30 is obtained, a skeleton trace method can be employed to perform another example of the human-robot-interaction safety monitoring step (S60). In this example, the human-robot-interaction safety monitoring step S60 includes the following steps. It is determined, based on continuous paths with respect to points of the skeleton space, whether historical paths of the points cross over at a same position, as shown in step S61, and whether a plurality of paths of the points cross over at a same time, as shown in step S62. It is determined, based on the velocity paths with respect to the points of the skeleton space (e.g., FIG. 5A), whether historical velocity paths of the points cross over, as shown in step S63, and whether directional properties of the velocity paths of the points are parallel, non-parallel, or directionless, as shown in step S64. It is determined, based on acceleration paths with respect to the points of the skeleton space (e.g., see FIG. 5A), whether historical acceleration paths of the points cross over, as shown in step S65, and whether the acceleration paths of the points are greater than or equal to zero, as shown in step S66.

In steps S61 and S62, if the historical paths of the points of the at least two spatial gesture images cross over at the same position, and the paths of the points of the at least two spatial gesture images cross over at the same time, it is determined that the gesture distribution does not meet the safety criterion and the collision warning step S67 is then performed. Conversely, if the historical paths of the points of the at least two spatial gesture images do not cross over at the same position, or the paths of the points of the at least two spatial gesture images do not cross over at the same time, it is determined that the gesture distribution meets the safety criterion, and thus the collision warning step S67 will not be performed.

In steps S63 and S64, if the historical velocity paths of the points of the at least two spatial gesture images cross over and the directional properties of the velocity paths of the points of the at least two spatial gesture images are non-parallel, it is determined that the gesture distribution does not meet the safety criterion and the collision warning step S67 is then performed. In addition, if the historical velocity paths of the points of the at least two spatial gesture images cross over, and the directional properties of the velocity paths of the points of the at least two spatial gesture images are parallel, it is further determined whether the paths of the points of the at least two spatial gesture images cross over at the same time (step S62). If so, it is determined that the gesture distribution does not meet the safety criterion and the collision warning step S67 is then performed. Further, if the historical velocity paths of the points of the at least two spatial gesture images cross over, and the directional properties of the velocity paths of the points of the at least two spatial gesture images are directionless, it is further determined whether the acceleration paths of the points of the at least two spatial gesture images are greater than or equal to zero. If they are greater than zero, the collision warning step S67 is performed; if they are equal to zero, the trap warning step S68 is performed.

In steps S65 and S66, if the historical acceleration paths of the points of the at least two spatial gesture images cross over, it is determined whether the acceleration paths of the points of the at least two spatial gesture images are greater than or equal to zero, so as to perform the collision warning step S67 or the trap warning step S68, respectively. Conversely, if the historical acceleration paths of the points of the at least two spatial gesture images do not cross over, or the acceleration paths of the points of the at least two spatial gesture images are less than zero, it is determined that the gesture distribution meets the safety criterion, and thus neither the collision warning step S67 nor the trap warning step S68 will be performed.

Further, the collision warning step can perform a collision warning instruction (as in step S67), for example, based on the above determination steps (e.g., steps S55-S58 or S61-S64); and the trap warning step can perform a trap warning instruction (as in step S68), for example, based on the above determination steps (e.g., steps S55-S58 or S61-S64).

Moreover, in FIG. 5B, if the above determination steps (e.g., steps S55-S58 or S61-S64) meet a safety criterion set in the process monitoring step S69, it indicates that the gesture distribution between the human and the robot is in a proper process, and thus neither the collision warning instruction nor trap warning instruction will be performed.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A safety monitoring method for human-machine symbiosis, comprising:
   a spatial image capturing step for acquiring at least two skeleton images;
   an image recognition step for generating at least two spatial gesture images corresponding to the at least two skeleton images, based on information of changes in position of the at least two skeleton images with respect to time;
   a human-robot-interaction safety monitoring step for generating a gesture distribution based on the at least two spatial gesture images and a safety distance; and
   a process monitoring step for determining whether the gesture distribution meets a safety criterion;
   wherein the image recognition step comprises: acquiring images for recognizing a human skeleton, a human skeleton dilation region, a robot skeleton, and a robot skeleton dilation region, to generate the at least two spatial gesture images.

2. The method according to claim 1, wherein the human-robot-interaction safety monitoring step sends a warning signal to a robot controller when the gesture distribution does not meet the safety criterion.

3. The method according to claim 2, further comprising a collision warning step and a trap warning step, wherein after the warning signal is sent, the collision warning step performs a collision warning instruction and the trap warning step performs a trap warning instruction.

4. The method according to claim 1, wherein the at least two spatial gesture images is represented by a contour map, and the human-robot-interaction safety monitoring step determines the gesture distribution, based on changes in vectors normal to a frontal surface of the contour map, and the frontal surface is an overlapping region of the at least two spatial gesture images.

5. The method according to claim 4, wherein the human-robot-interaction safety monitoring step includes:
acquiring a human skeleton contour map, a robot skeleton contour map, a human-robot-interaction contour map, and a human-robot-interaction contour gradient map;
determining, based on the human-robot-interaction contour map, whether there is a frontal surface of the human-robot-interaction contour map at a same height, and comparing the height at which the frontal surface is with a preset value; and
determining, based on the human-robot-interaction contour gradient map, whether any contour gradient vectors cross over.

6. The method according to claim 5, wherein if the contour map has the frontal surface existing at the same height, and the height of the frontal surface is equal to the preset value, it is determined that the gesture distribution does not meet the safety criterion.

7. The method according to claim 5, wherein the contour gradient vectors cross over, it is determined whether directional properties of velocity paths of points of the at least two spatial gesture images change or remain unchanged, so as to perform a collision warning step or a trap warning step.

8. The method according to claim 1, wherein the image recognition step further comprises performing an image pre-processing step for acquiring the information including a position, a continuous path, a velocity vector, a velocity path, an acceleration vector, and an acceleration path, with respect to a point in a skeleton space.

9. The method according to claim 8, wherein the human-robot-interaction safety monitoring step comprises:
determining, based on the continuous path with respect to the point of the skeleton space, whether historical paths of points of the at least two spatial gesture images cross over at a same position, and whether paths of the points of the at least two spatial gesture images cross over at a same time;
determining, based on the velocity path with respect to the point of the skeleton space, whether historical velocity paths of the points of the at least two spatial gesture images cross over, and whether directional properties of velocity paths of the points of the at least two spatial gesture images are parallel, non-parallel, or directionless; and
determining, based on the acceleration path with respect to the point of the skeleton space, whether historical acceleration paths of the points of the at least two spatial gesture images cross over, and whether acceleration paths of the points of the at least two spatial gesture images are greater than or equal to zero.

10. The method according to claim 9, wherein if the historical paths of the points of the at least two spatial gesture images cross over at the same position, and the paths of the points of the at least two spatial gesture images cross over at the same time, it is determined that the gesture distribution does not meet the safety criterion.

11. The method according to claim 9, wherein if the historical velocity paths of the points of the at least two spatial gesture images cross over and the directional properties of the velocity paths of the points of the at least two spatial gesture images are non-parallel, it is determined that the gesture distribution does not meet the safety criterion.

12. The method according to claim 9, wherein if the historical velocity paths of the points of the at least two spatial gesture images cross over, and the directional properties of the velocity paths of the points of the at least two spatial gesture images are directionless, it is further determined whether the acceleration paths of points of the at least two spatial gesture images are greater than or equal to zero.

13. The method according to claim 9, wherein if the historical velocity paths of the points of the at least two spatial gesture images cross over, and the directional properties of the velocity paths of the points of the at least two spatial gesture images are parallel, it is further determined whether the paths of the points of the at least two spatial gesture images cross over at the same time.

14. The method according to claim 9, wherein if the historical acceleration paths of the points of the at least two spatial gesture images cross over, it is further determined whether the acceleration paths of the points of the at least two spatial gesture images are greater than or equal to zero, so as to perform a collision warning step or a trap warning step, respectively.

* * * * *